US009116582B2

(12) United States Patent
Mohindra et al.

(10) Patent No.: US 9,116,582 B2
(45) Date of Patent: Aug. 25, 2015

(54) CAPACITIVE TOUCH PANEL HAVING PROTRUSIONS FORMED BETWEEN DRIVE AND/OR SENSOR ELECTRODES

(75) Inventors: Rishi Mohindra, Milpitas, CA (US); Guozhong Shen, San Jose, CA (US); Kenneth W. Knox, Palo Alto, CA (US)

(73) Assignee: Qualcomm Technologies, Inc., San Diego, CA (US)

( * ) Notice: Subject to any disclaimer, the term of this patent is extended or adjusted under 35 U.S.C. 154(b) by 851 days.

(21) Appl. No.: 13/370,087

(22) Filed: Feb. 9, 2012

(65) Prior Publication Data

US 2013/0207923 A1 Aug. 15, 2013

(51) Int. Cl.
G06F 3/045 (2006.01)
G06F 3/044 (2006.01)

(52) U.S. Cl.
CPC ...... *G06F 3/044* (2013.01); *G06F 2203/04111* (2013.01)

(58) Field of Classification Search
CPC .................. G06F 3/044; G06F 2203/04111
See application file for complete search history.

(56) References Cited

U.S. PATENT DOCUMENTS

| 4,999,462 | A * | 3/1991 | Purcell .................. 178/18.03 |
| 8,278,571 | B2 | 10/2012 | Orsley | |
| 2007/0262962 | A1* | 11/2007 | XiaoPing et al. ............. 345/173 |
| 2010/0044122 | A1* | 2/2010 | Sleeman et al. ........... 178/18.06 |
| 2010/0045615 | A1* | 2/2010 | Gray et al. .................... 345/173 |
| 2010/0144391 | A1* | 6/2010 | Chang et al. .................. 455/566 |
| 2010/0302201 | A1 | 12/2010 | Ritter et al. | |
| 2011/0007028 | A1 | 1/2011 | Curtis et al. | |
| 2013/0057511 | A1* | 3/2013 | Shepelev et al. ............. 345/174 |
| 2013/0106762 | A1* | 5/2013 | Shahparnia et al. ......... 345/174 |
| 2013/0207924 | A1 | 8/2013 | Mohindra et al. | |

OTHER PUBLICATIONS

Tong-Hun Hwang, Wan-Hai Cui, Ik-Seok Yang, Oh-Kyong Kwon; A Highly Area-Efficient Controller for Capacitive Touch Screen Panel Systems; IEEE Transactions on Consumer Electronics; vol. 56, No. 2; May 2010; pp. 1115 to 1122.

* cited by examiner

*Primary Examiner* — Amare Mengistu
*Assistant Examiner* — Crystal A Mathews
(74) *Attorney, Agent, or Firm* — Weaver Austin Villeneuve & Sampson, LLP

(57) ABSTRACT

A capacitive touch panel includes elongated drive electrodes arranged next to one another and having a characteristic spacing between adjacent drive electrodes. The capacitive touch panel also includes elongated sensor electrodes arranged next to one another across the drive electrodes and having a characteristic spacing between adjacent sensor electrodes. The drive electrodes and/or the sensor electrodes have protrusions into the spaces between adjacent electrodes. The characteristic spacing between the sensor electrodes may be at least substantially greater than the characteristic spacing between the drive electrodes. The sensor electrodes may have a pitch based upon a touch diameter of a finger, and the touch panel may be capable of sensing a stylus having a touch diameter substantially less than the touch diameter of the finger.

17 Claims, 9 Drawing Sheets

CAPACITIVE TOUCH PANEL HAVING PROTRUSIONS FORMED BETWEEN DRIVE AND/OR SENSOR ELECTRODES

BACKGROUND

A touch panel is a human machine interface (HMI) that allows an operator of an electronic device to provide input to the device using an instrument such as a finger, a stylus, and so forth. For example, the operator may use his or her finger to manipulate images on an electronic display, such as a display attached to a mobile computing device, a personal computer (PC), or a terminal connected to a network. In some cases, the operator may use two or more fingers simultaneously to provide unique commands, such as a zoom command, executed by moving two fingers away from one another; a shrink command, executed by moving two fingers toward one another; and so forth.

A touch screen is an electronic visual display that incorporates a touch panel overlying a display to detect the presence and/or location of a touch within the display area of the screen. Touch screens are common in devices such as all-in-one computers, tablet computers, satellite navigation devices, gaming devices, and smartphones. A touch screen enables an operator to interact directly with information that is displayed by the display underlying the touch panel, rather than indirectly with a pointer controlled by a mouse or touchpad. Capacitive touch panels are often used with touch screen devices. A capacitive touch panel generally includes an insulator, such as glass, coated with a transparent conductor, such as indium tin oxide (ITO). As the human body is also an electrical conductor, touching the surface of the panel results in a distortion of the panel's electrostatic field, measurable as a change in capacitance.

SUMMARY

A capacitive touch panel that uses patterns, such as geometrical patterns, to provide spatial resolution for both a stylus and a finger is disclosed. In one or more implementations, the capacitive touch panel includes elongated drive electrodes arranged next to one another and having a characteristic spacing between adjacent drive electrodes. The capacitive touch panel also includes elongated sensor electrodes arranged next to one another across the drive electrodes and having a characteristic spacing between adjacent sensor electrodes. The characteristic spacing between the sensor electrodes may be at least substantially greater than the characteristic spacing between the drive electrodes. The drive electrodes and/or the sensor electrodes include protrusions that extend into the spaces between adjacent electrodes. In some implementations, the sensor electrodes may have a pitch based upon a touch diameter of a finger, wherein the touch panel is capable of sensing a stylus having a touch diameter substantially less than the touch diameter of the finger when the stylus is used in the spaces between adjacent sensor electrodes (e.g., due to capacitance between the stylus and the protrusions).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Overview

Cross-bar X and Y ITO patterns are typically used in mutual capacitance based capacitive touch panels. For capacitive touch panels use to sense finger touches, the ITO spacing between the parallel traces (for both vertical/column traces and horizontal/row traces) is smaller than the diameter of the human finger. Because the human finger has a touch diameter in the range of about five to ten millimeters (5 mm-10 mm), the ITO spacing is typically less than five millimeters (5 mm) to provide adequate touch accuracy for the touch of one or more fingers and adequate resolution for a touch comprising two or more fingers (e.g., when the fingers are separated by about ten and one-half millimeters (10.5 mm) center to center).

Figure 1:
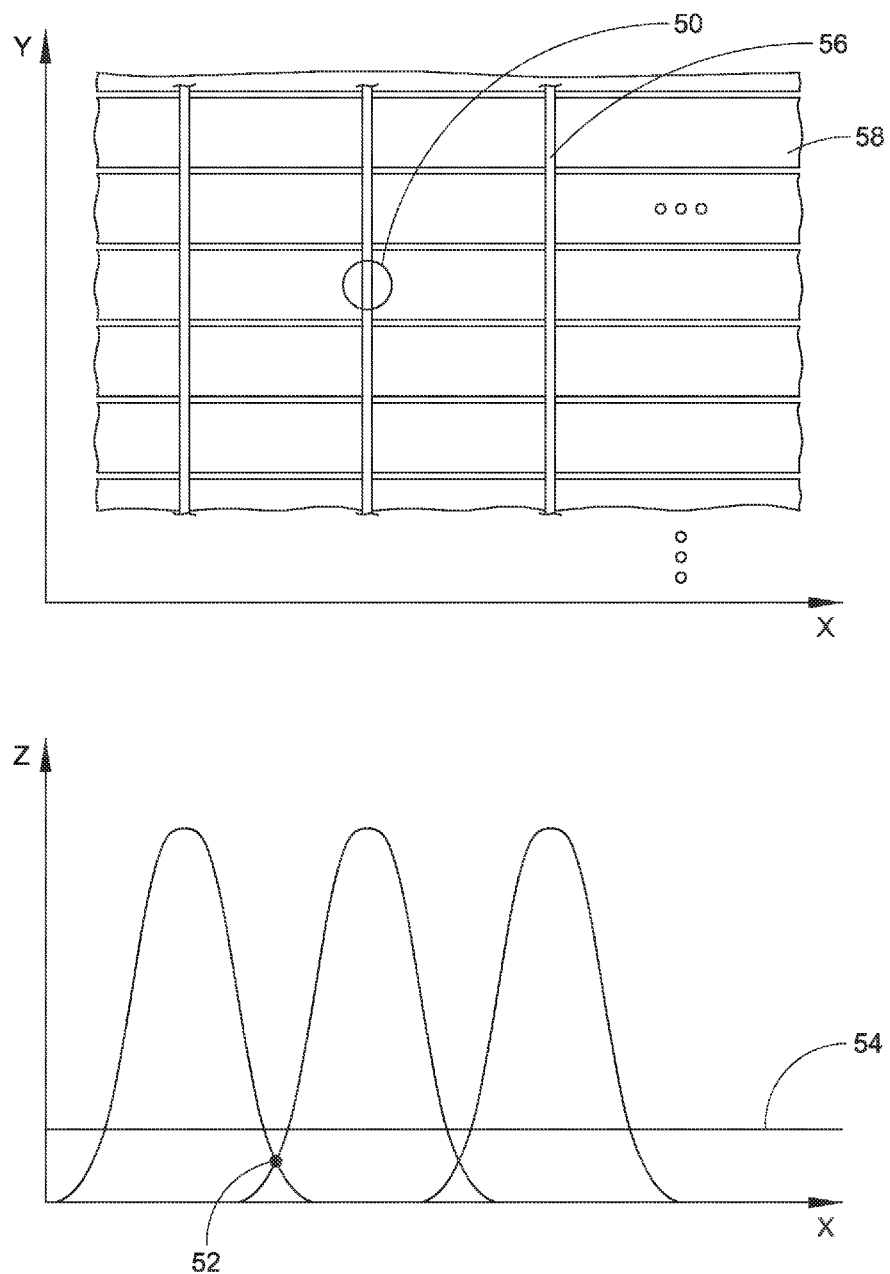
FIG. 1 is a diagrammatic illustration of electrode traces for a touch panel, and a graph illustrating a response generated when an instrument is moved across touch panel sensor electrodes in an X-direction with respect to the X-axis of the graph.

It is often desirable to allow an operator of a touch panel to use a writing accessory, such as a stylus, which includes a generally pointed end having a smaller diameter than a finger. However, to support a stylus with, for example, about a one to two millimeter (1 mm-2 mm) touch diameter, the responsiveness of a touch panel using five millimeter (5 mm) ITO spacing may be unacceptable due to the existence of a large number of "dead zones," or areas where touch coordinates do not change with stylus position and/or where a stylus signal is too weak to be measured between adjacent columns, leading to computed touch coordinates having large jumps and discontinuities. For example, with reference to FIG. 1, as an instrument having a touch profile 50 moves across a touch panel having sensor traces 56 capacitively coupled with drive traces 58, the response of the sensor traces 56 will decrease rapidly as the instrument moves between each sensor trace. This can lead to signal loss and/or provide a signal that is not suitable for interpolation when, for example, the crossover point 52 between signals from adjacent electrodes falls below the noise threshold 54 of the touch panel.

With large touch panels, it may be impractical to maintain a five millimeter (5 mm) pitch for traces used in rows and columns, since the number of traces becomes very large, and the traces then require more touch controller circuitry (e.g., more driver and associated Digital to Analog (D/A) circuitry, more Low Noise Amplifier (LNA) circuitry, and/or more Analog-to-Digital Conversion (ADC) circuitry). Making the pitch larger than about five millimeters (5 mm) for touch panels can result in the same inability to adequately track finger touches as described above with reference to tracking a stylus on a touch panel configured for a finger.

Accordingly, a touch panel is described that uses patterns, such as geometrical patterns, to provide spatial resolution for both a stylus and a finger. Capacitive touch panels configured in accordance with the present disclosure can allow a stylus to be used with a touch panel that has spacing between rows and/or columns configured for a finger without increasing the number of rows and/or columns in the capacitive touch panel. For example, by using geometrical patterns for the ITO, a five millimeter (5 mm) ITO trace pitch may be capable of supporting a one millimeter (1 mm) stylus. Further, with large touch panels, the pitch can be made larger than five millimeters (5 mm) (e.g., for supporting fingers). Thus, the required touch controller circuitry and power may not be impacted significantly when supporting a stylus and/or when supporting large panels.

Example Implementations

FIGS. 2 through 5 illustrate example mutual capacitance Projected Capacitive Touch (PCT) panels 100 in accordance with example implementations of the present disclosure. The capacitive touch panels 100 can be used to interface with electronic devices including, but not necessarily limited to: large touch panel products, all-in-one computers, mobile computing devices (e.g., hand-held portable computers, Personal Digital Assistants (PDAs), laptop computers, netbook computers, tablet computers, and so forth), mobile telephone devices (e.g., cellular telephones and smartphones), portable game devices, portable media players, multimedia devices, satellite navigation devices (e.g., Global Positioning System (GPS) navigation devices), e-book reader devices (eReaders), Smart Television (TV) devices, surface computing devices (e.g., table top computers), Personal Computer (PC) devices, as well as with other devices that employ touch-based human interfaces.

The capacitive touch panels 100 may comprise ITO touch panels that include drive electrodes 102, such as cross-bar ITO drive traces/tracks, arranged next to one another (e.g., along parallel tracks, generally parallel tracks, and so forth). In implementations, the drive electrodes 102 can be formed using highly conductive, optically transparent horizontal and/or vertical spines/bars 104. The bars 104 can reduce the resistance of the row and/or column traces, resulting in reduced phase shifts across the panel and reducing the complexity of the touch controller circuitry. The drive electrodes 102 are elongated (e.g., extending along a longitudinal axis). For example, each drive electrode 102 may extend along an axis on a supporting surface, such as a substrate of a capacitive touch panel 100. The drive electrodes 102 have a pitch 106 (e.g., a substantially repetitive spacing between adjacent axes of the drive electrodes 102). In implementations, the drive electrodes 102 also have a characteristic spacing 108 comprising a minimum distance between adjacent edges of the drive electrodes 102.

The capacitive touch panels 100 also include sensor electrodes 110, such as cross-bar ITO sensor traces/tracks, arranged next to one another across the drive electrodes 102 (e.g., along parallel tracks, generally parallel tracks, and so forth). In implementations, the sensor electrodes 110 can be formed using highly conductive, optically transparent horizontal and/or vertical spines/bars 104 (e.g., as previously described). The sensor electrodes 110 are elongated (e.g., extending along a longitudinal axis). For instance, each sensor electrode 110 may extend along an axis on a supporting surface, such as a substrate of a capacitive touch panel 100. The sensor electrodes 110 have a pitch 112 (e.g., a substantially repetitive spacing between adjacent axes of the sensor electrodes 110).

Figure 2:
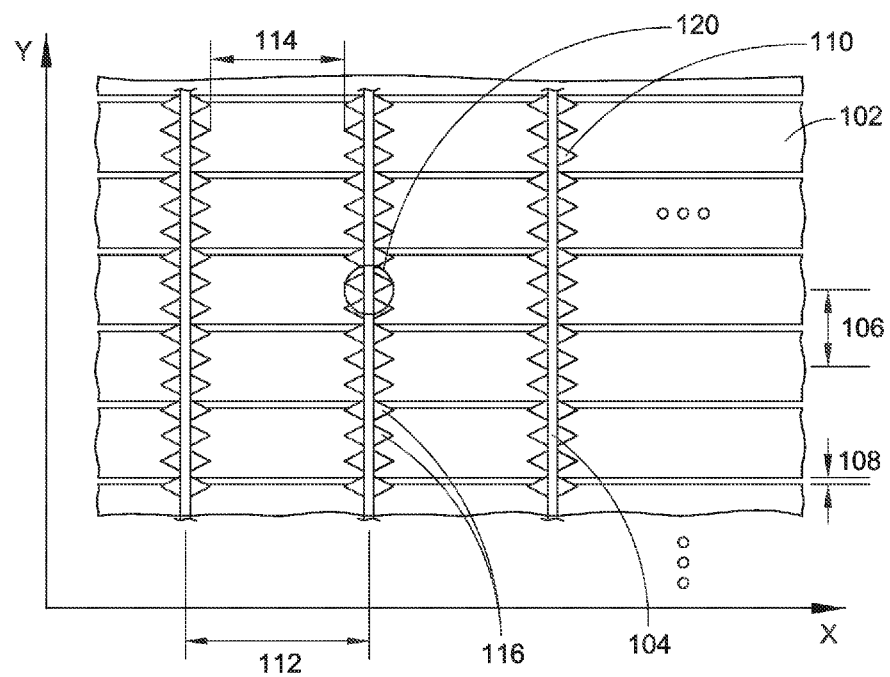
FIG. 2 is a diagrammatic illustration of electrodes for a touch panel, and a graph illustrating a response generated when an instrument is moved across touch panel sensor electrodes in an X-direction with respect to the X-axis of the graph, where the sensor electrodes include repeating protrusions in accordance with example implementations of the present disclosure.
Figure 2:
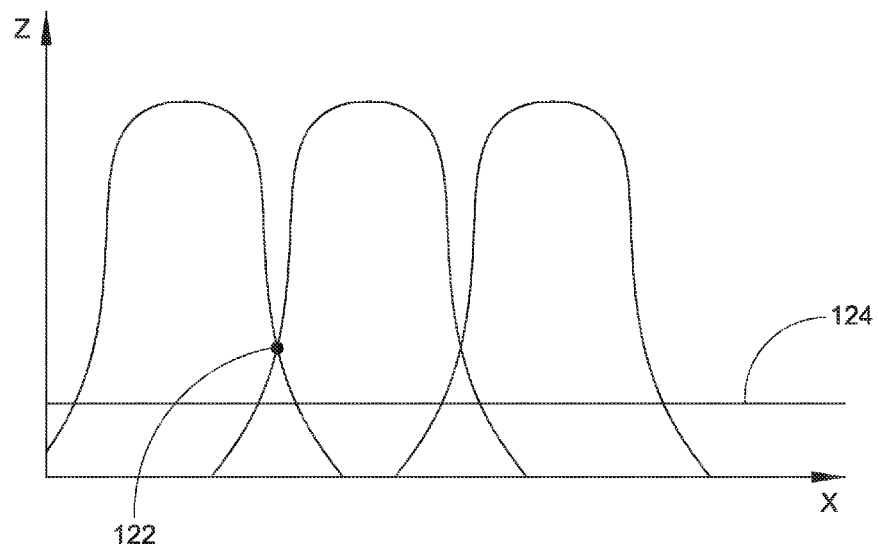
Figure 3:
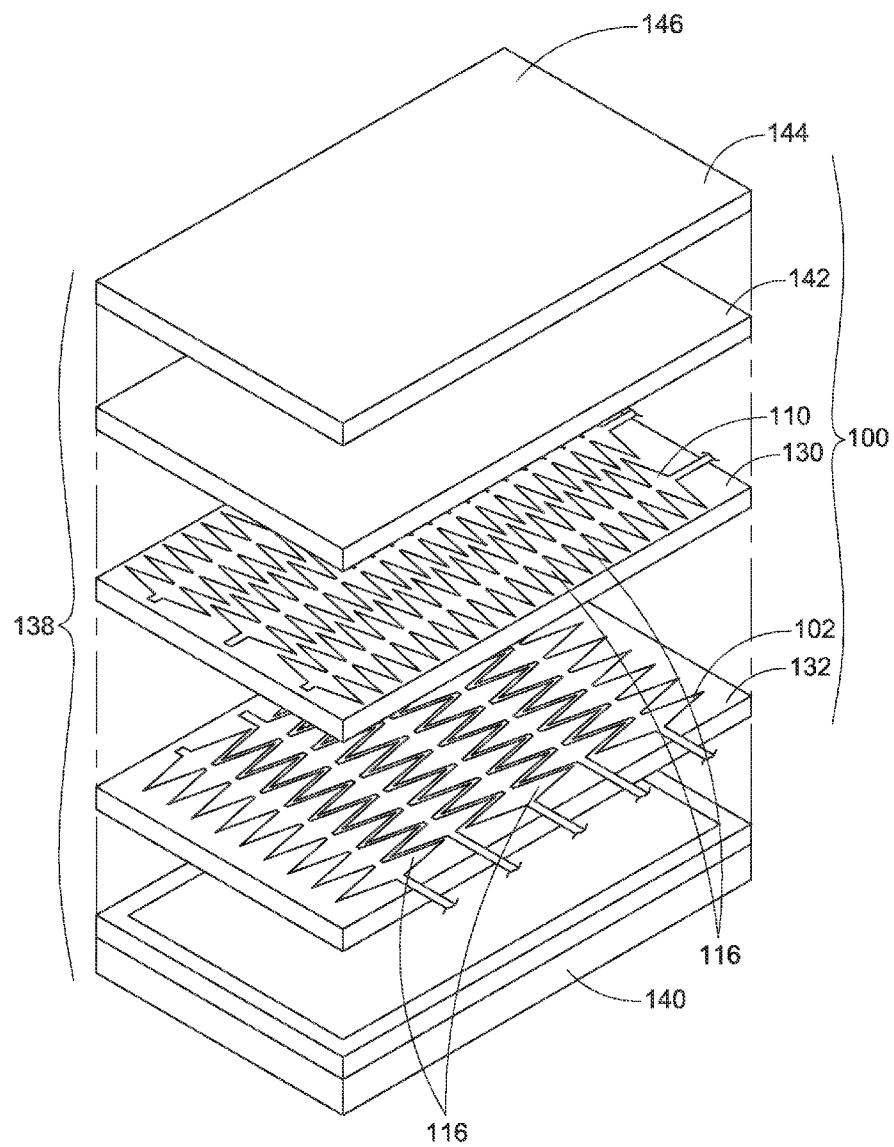
FIG. 3 is an exploded isometric view illustrating a touch screen assembly incorporating a touch panel having sensor and drive electrodes including repeating protrusions in accordance with example implementations of the present disclosure.
Figure 4A:
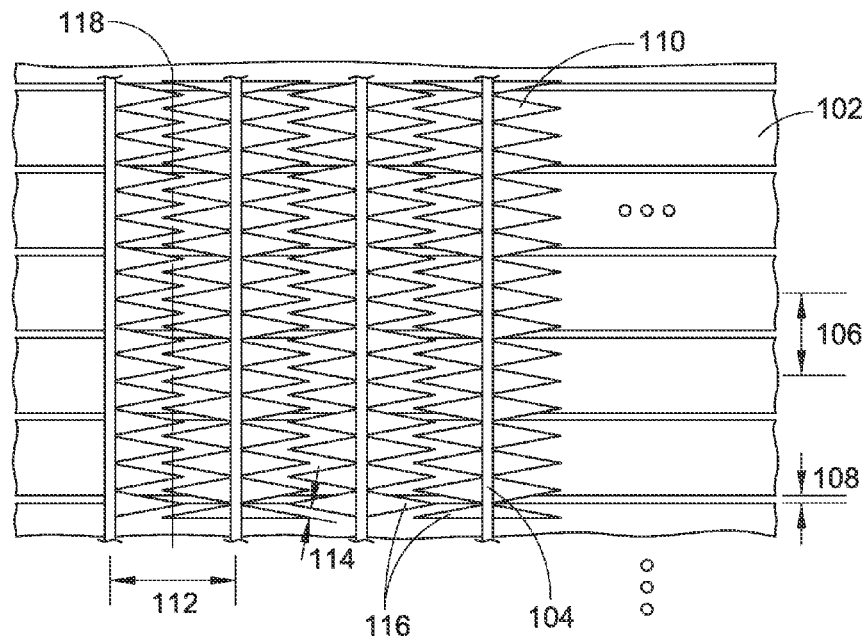
FIG. 4A is a top plan view illustrating sensor and drive electrodes for a touch panel, where the sensor electrodes include repeating protrusions extending past a center line between the sensor and drive electrodes in accordance with example implementations of the present disclosure.

In implementations, the pitch 112 is based upon the touch diameter of a finger. For example, the pitch 112 between adjacent sensor electrodes 110 may be about five millimeters (5 mm) center-to-center. However, a pitch 112 of five millimeters (5 mm) is provided by way of example only and is not meant to be restrictive of the present disclosure. Thus, other implementations may have a pitch 112 of more or less than five millimeters (5 mm). In implementations, the sensor electrodes 110 also have a characteristic spacing 114 comprising a minimum distance between adjacent edges of the sensor electrodes 110. In some instances, the characteristic spacing 114 is measured between adjacent edges of the sensor electrodes 110 in a direction perpendicular to the sensor electrodes 110 (e.g., as shown in FIG. 2), while in other instances, the characteristic spacing 114 is measured between adjacent edges of the sensor electrodes 110 at an angle relative to the sensor electrodes 110 (e.g., as shown in FIG. 4A).

The drive electrodes 102 and the sensor electrodes 110 define a coordinate system where each coordinate location (pixel) comprises a capacitor formed at each intersection between one of the drive electrodes 102 and one of the sensor electrodes 110. Thus, the drive electrodes 102 are configured to be connected to an electrical current source for generating a local electrostatic field at each capacitor, where a change in the local electrostatic field generated by a finger and/or a stylus at each capacitor causes a decrease in capacitance associated with a touch at the corresponding coordinate location. In this manner, more than one touch can be sensed at differing coordinate locations simultaneously (or at least substantially simultaneously). In implementations, the drive electrodes 102 can be driven by the electrical current source in parallel, e.g., where a set of different signals are provided to the drive electrodes 102. In other implementations, the drive electrodes 102 can be driven by the electrical current source in series, e.g., where each drive electrode 102 or subset of drive electrodes 102 is driven one at a time.

Figure 4B:
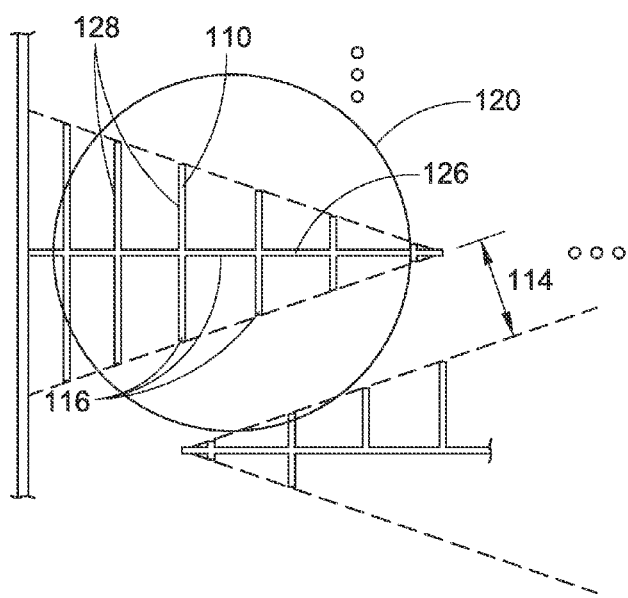
FIG. 4B is a top plan view illustrating sensor electrodes for a touch panel, where the sensor electrodes include repeating protrusions, and each repeating protrusion includes finger-like protrusions in accordance with example implementations of the present disclosure.

The sensor electrodes 110 and/or the drive electrodes 102 include a series of one or more fins/protrusions 116 into the spaces between adjacent electrodes. In implementations, the bars 104 of the sensor electrodes 110 and/or the drive electrodes 102 can act as spines for the protrusions 116. The protrusions 116 may taper away from the sensor electrodes 110 and/or the drive electrodes 102. For example, the protrusions 116 can be repeating and triangle-shaped (e.g., sawtoothed as shown in FIGS. 2, 3, 4A, 4D, 4E, 5A and 5B). Further, the protrusions 116 can extend past a center line 118 defined between adjacent sensor electrodes 110 and/or adjacent drive electrodes 102 (e.g., as shown in FIGS. 4A, 4B, and 4E, where the protrusions 116 are interleaved).

The protrusions 116 are configured to provide a capacitive touch panel 100 with a broader and more linear touch profile in both the X and Y-directions (e.g., providing a signal that is suitable for interpolation). For example, with reference to FIG. 2, as an instrument having a touch profile 120 moves across a capacitive touch panel 100 having protrusions 116 formed in a sawtooth pattern, the responses of the electrodes will be more linear/decrease less rapidly as the instrument moves into the spaces between the sensor electrodes 110 (e.g., when compared to the configuration with column bars shown in FIG. 1). For instance, a stylus may have a uniformly changing coupling to adjacent column traces as it moves across the traces in the X-direction, and the computed touch coordinates will therefore change much more uniformly with minimal dead zones. This can improve signal reception such that the crossover point 122 between signals from adjacent sensor electrodes 110 may remain above the noise threshold 124 of the touch panel, resulting in a constant signal between the various coordinate locations. Thus, capacitive touch panels 100 configured in accordance with the present disclosure can be used with a stylus having a touch diameter substantially less than the touch diameter of a finger, even when the electrodes of the touch panel comprise a pitch based upon the touch diameter of a finger (e.g., as previously described).

The protrusions 116 can be configured to provide the sensor electrodes 110 and/or the drive electrodes 102 with an increased perimeter with respect to the surface area occupied by the electrodes. This configuration can furnish an increased edge-length for the electrodes, which may reduce mutual capacitance between the sensor electrodes 110 and the drive electrodes 102, and enhance the fringe capacitance of the sensor electrodes 110 and their mutual capacitance with an instrument such as a finger. In some implementations, the protrusions 116 can be circuitously-shaped, and so forth. With reference to FIG. 4B, the protrusions 116 can occupy a generally triangular area, having a number of primary/main protrusions 126 with one or more finger-like (thin rectangular) protrusions 128 extending from each main protrusion 126. This configuration may provide a more linear change in, for example, finger profile as an instrument moves away from one electrode and toward another electrode. It should be noted that while FIG. 4B illustrates the spacing between the finger-like protrusions 128 increasing farther from the axes of sensor electrodes 110, the spacing between the finger-like protrusions 128 may also decrease farther from the axes of sensor electrodes 110, may be relatively constant, or may increase and decrease in an alternating, random, or semi-random pattern. Further, it should be noted that the finger-like protrusions 128 may themselves have protrusions (e.g., exhibiting self-similarity), and so forth.

Figure 4C:
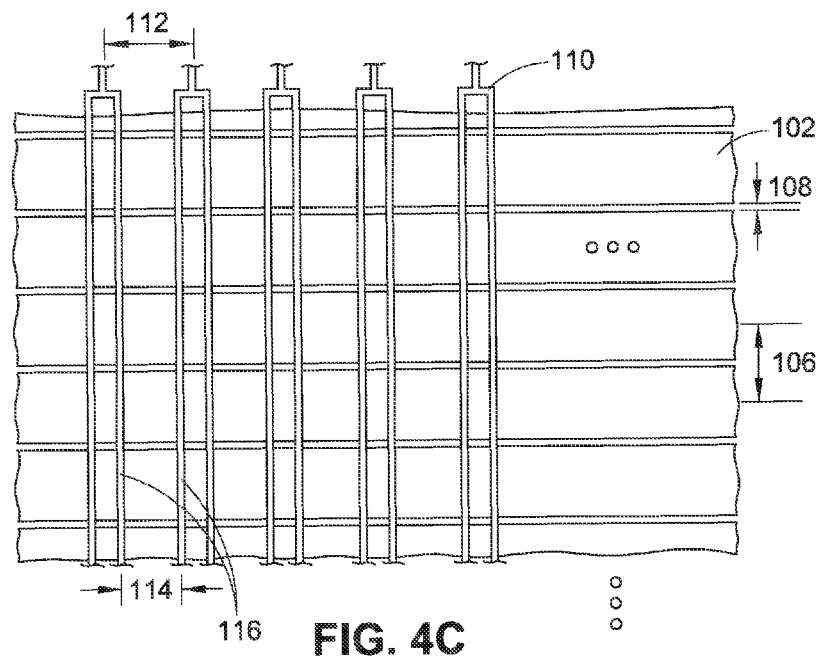
FIG. 4C is a top plan view illustrating sensor and drive electrodes for a touch panel, where the sensor electrodes include protrusions in accordance with example implementations of the present disclosure.
Figure 4D:
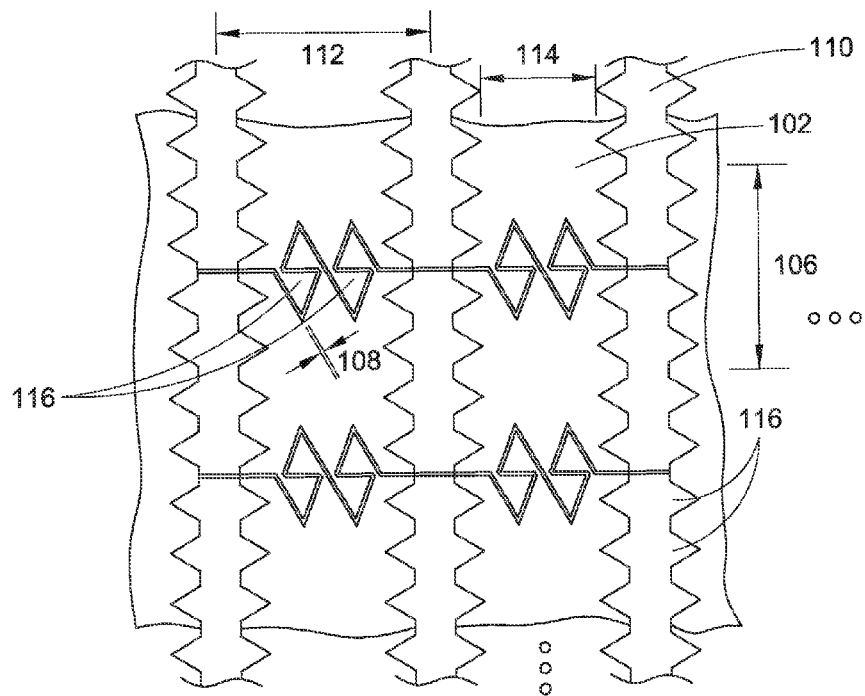
FIG. 4D is a top plan view illustrating sensor and drive electrodes for a touch panel, where the sensor and drive electrodes include repeating protrusions in accordance with example implementations of the present disclosure.
Figure 4E:
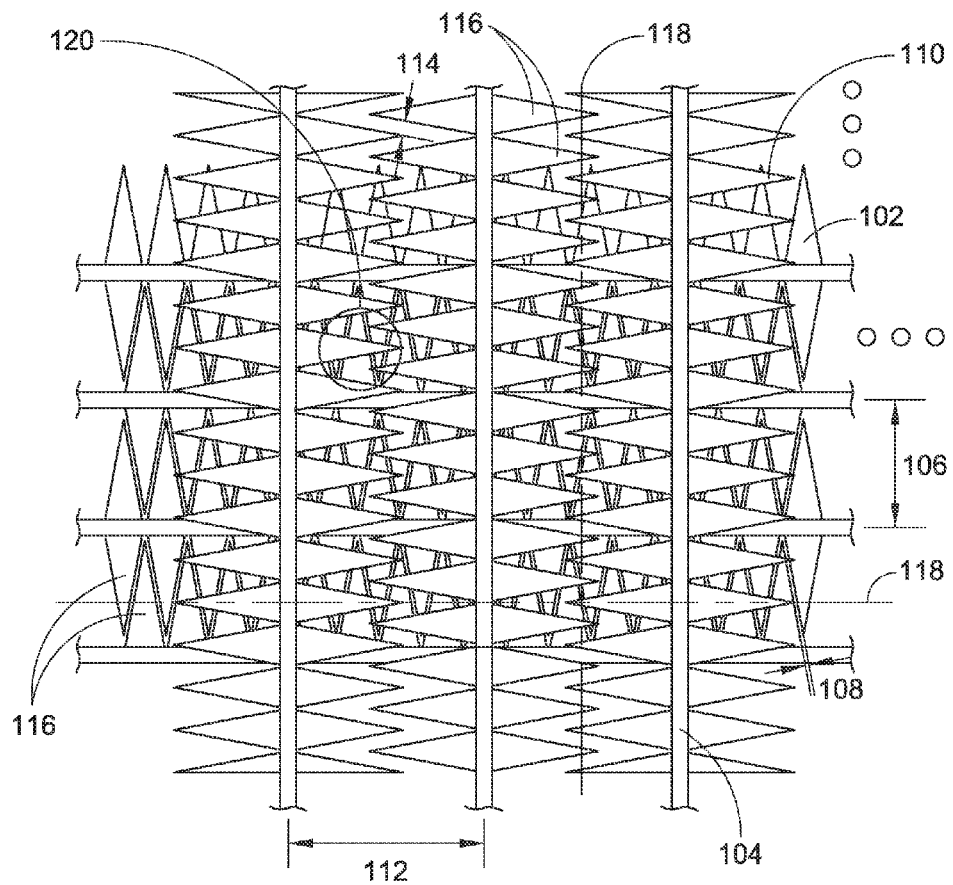
FIG. 4E is a top plan view illustrating sensor and drive electrodes for a touch panel, where the sensor and drive electrodes include repeating protrusions extending past center lines between the sensor and drive electrodes in accordance with example implementations of the present disclosure.

With reference to FIG. 4C, the protrusions 116 can occupy a generally rectangular area defining a rectangular gap therein (e.g., in the manner of a "double bar"). This configuration may serve to blur the sharp finger profile for a stylus, and slightly extend the coverage of the profile. It should be noted that the drive electrodes 102 and the sensor electrodes 110 may each have differently shaped protrusions. For example, sawtooth-shaped protrusions may be used with the drive electrodes 102, while finger-like protrusions may be used with the sensor electrodes 110. Further, different rows of one kind/layer of electrode may have different protrusions. For example, one row of sensor electrodes 110 may have finger-like protrusions, while an adjacent row of sensor electrodes 110 may have sawtooth-shaped protrusions, and so forth. In implementations, a dynamic reduction of the noise threshold for image zeroing may also be used (e.g., to extend the finger profile for a stylus, and so forth).

In implementations, the characteristic spacing 114 of the sensor electrodes 110 is at least substantially greater than the characteristic spacing 108 of the drive electrodes 102. For example, it may be desirable to maintain a greater spacing between the sensor electrodes 110 relative to the spacing between the drive electrodes 102 in order to reduce column-to-column capacitance and provide sufficient fringe capacitance from the edges/sides of the sensor electrodes 110 to the drive electrodes 102. Further, it may be desirable to maintain a tighter spacing between the drive electrodes 102 relative to the sensor electrodes 110 in order to shield the sensor electrodes 110 from noise generated by other circuitry (e.g., noise from an underlying Liquid Crystal Display (LCD) screen, and so forth). In implementations, the characteristic spacing 114 of the sensor electrodes 110 is between about two times and five times (2-5×) the characteristic spacing 108 of the drive electrodes 102. However, this spacing is provided by way of example only and is not meant to be restrictive of the present disclosure. Thus, the characteristic spacing 114 of the sensor electrodes 110 can be less than two times (2×) (e.g., one and one-half times (1.5×)) and/or more than five times (5×) (e.g., ten times (10×)) the characteristic spacing 108 of the drive electrodes 102.

Figure 5A:
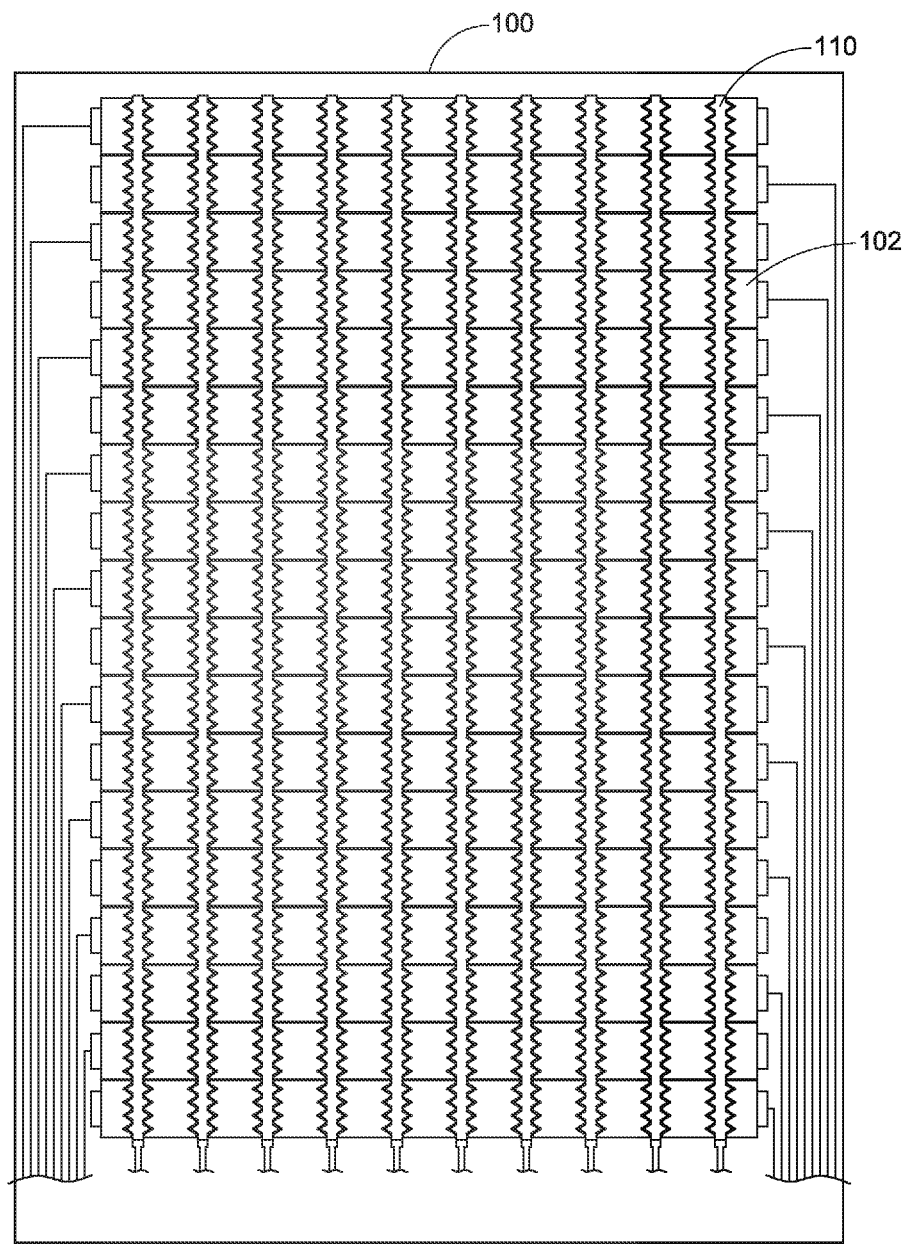
FIGS. 5A and 5B are top plan views illustrating sensor and drive electrodes for a touch panel, where the sensor and drive electrodes are positioned on a single layer with jumpers connecting portions of the drive electrodes, and where the sensor electrodes include repeating protrusions in accordance with example implementations of the present disclosure.
Figure 5B:
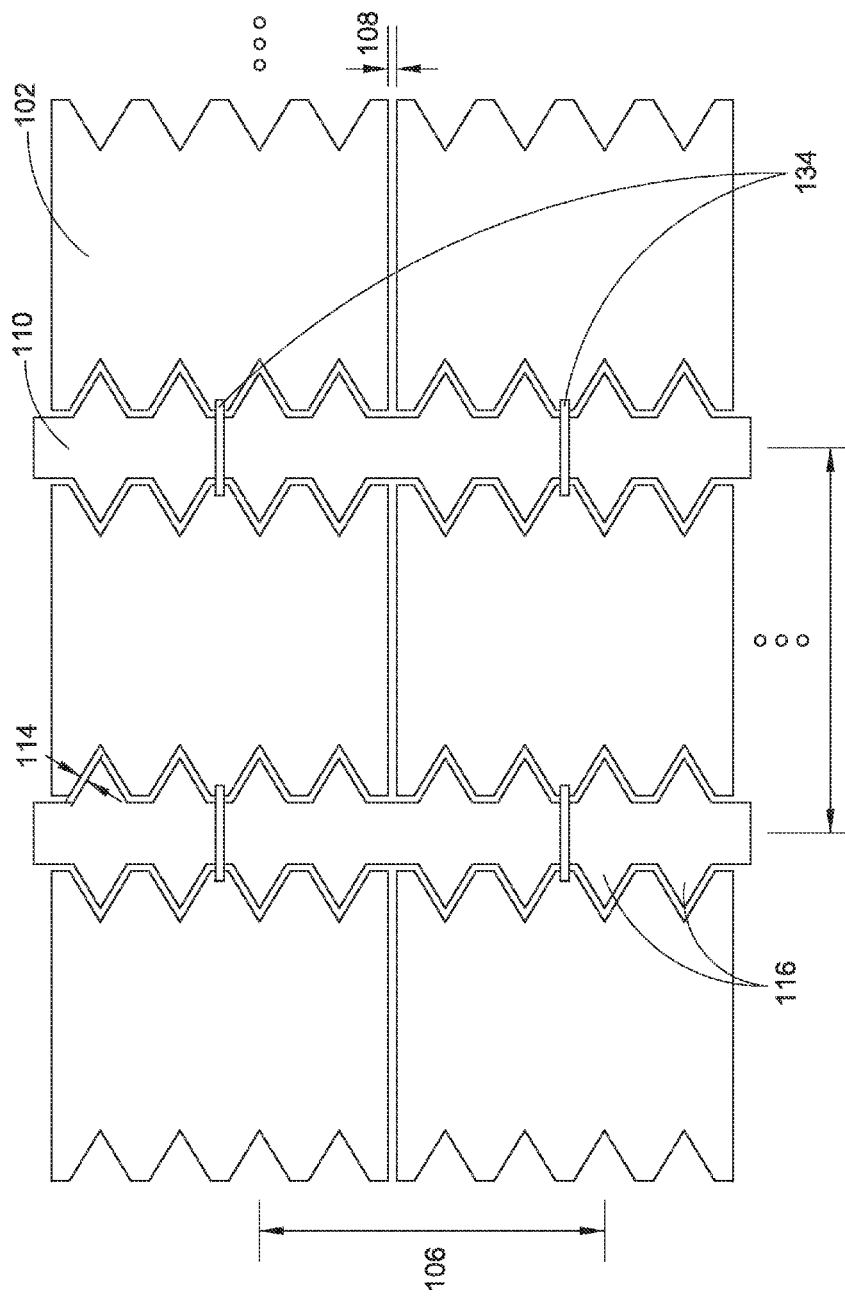

The sensor electrodes 110 are electrically insulated from the drive electrodes 102 (e.g., using a dielectric layer, and so forth). For example, the sensor electrodes 110 may be provided on one substrate (e.g., comprising a sensor layer 130 disposed on a glass substrate), and the drive electrodes 102 may be provided on a separate substrate (e.g., comprising a drive layer 132 disposed on another substrate). In this two-layer configuration, the sensor layer 130 can be disposed above the drive layer 132 (e.g., with respect to a touch surface). For example, the sensor layer 130 can be positioned closer to a touch surface than the drive layer 132. However, this configuration is provided by way of example only and is not meant to be restrictive of the present disclosure. Thus, other configurations can be provided where the drive layer 132 is positioned closer to a touch surface than the sensor layer 130, and/or where the sensor layer 130 and the drive layer 132 comprise the same layer. For instance, in a 1.5-layer implementation (e.g., where the drive layer 132 and the sensor layer 130 are included on the same layer but physically separated from one another), one or more jumpers 134 can be used to connect portions of a drive electrode 102 together (e.g., as illustrated in FIGS. 5A and 5B). Similarly, jumpers can be used to connect portions of a sensor electrode 110 together.

One or more capacitive touch panels 100 can be included with a touch screen assembly 138. The touch screen assembly 138 may include a display screen, such as an LCD screen 140, where the sensor layer 130 and the drive layer 132 are sandwiched between the LCD screen 140 and a bonding layer 142, e.g., with a protective cover 144 (e.g., glass) attached thereto. The protective cover 144 may include a protective coating, an anti-reflective coating, and so forth. The protective cover 144 may comprise a touch surface 146, upon which an operator can use one or more fingers, a stylus, and so forth to input commands to the touch screen assembly 138. The commands can be used to manipulate graphics displayed by, for example, the LCD screen 140. Further, the commands can be used as input to an electronic device connected to a capacitive touch panel 100, such as a multimedia device or another electronic device (e.g., as previously described).

Example Process

Figure 6:
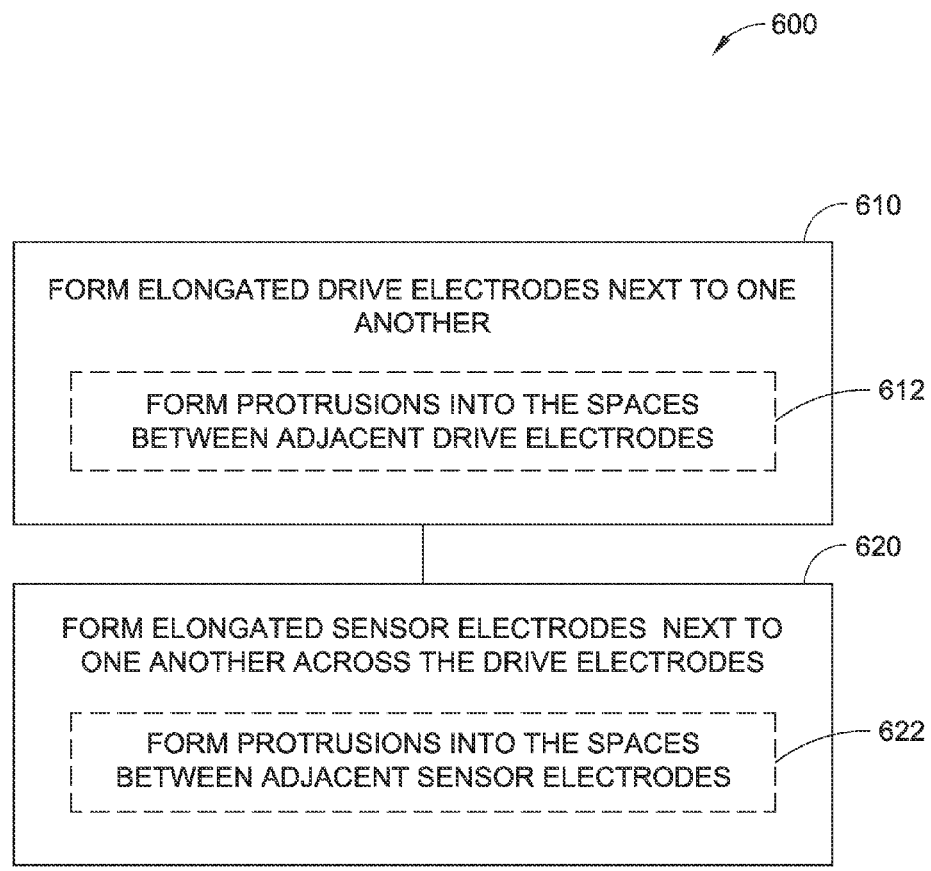
FIG. 6 is a flow diagram illustrating a method of forming a touch panel in accordance with example implementations of the present disclosure.

Referring now to FIG. 6, example techniques are described for furnishing capacitive touch panels having electrodes with protrusions extending into the spaces between the electrodes.

FIG. 6 depicts a process 600, in an example implementation, for furnishing a capacitive touch panel, such as the capacitive touch panel 100 illustrated in FIGS. 2 through 5 and described above. In the process 600 illustrated, elongated drive electrodes arranged next to one another are formed (Block 610). For example, with reference to FIGS. 2 through 5, drive electrodes 102, such as cross-bar ITO drive traces/tracks, are arranged next to one another. The drive electrodes 102 can be formed on a substrate of a capacitive touch panel 100 using highly conductive, optically transparent horizontal and/or vertical bars 104. In some implementations, protrusions are formed into the spaces between adjacent drive electrodes (Block 612). For instance, with continuing reference to FIGS. 2 through 5, the drive electrodes 102 can include a series of one or more protrusions 116 into the spaces between adjacent drive electrodes 102. In some instances, bars 104 of the drive electrodes 102 can act as spines for the protrusions 116.

Next, elongated sensor electrodes arranged next to one another across the drive electrodes are formed (Block 620). For example, with continuing reference to FIGS. 2 through 5, sensor electrodes 110, such as cross-bar ITO sensor traces/tracks, are arranged next to one another across drive electrodes 102. The sensor electrodes 110 can be formed on a substrate of a capacitive touch panel 100 using highly conductive, optically transparent horizontal and/or vertical bars 104. Then, protrusions are formed into the spaces between adjacent sensor electrodes (Block 622). For instance, with continuing reference to FIGS. 2 through 5, the sensor electrodes 110 can include a series of one or more protrusions 116 into the spaces between adjacent sensor electrodes 110. In some instances, bars 104 of the sensor electrodes 110 can act as spines for the protrusions 116.

Conclusion

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A mutual capacitance Projected Capacitive Touch (PCT) panel comprising:
   a plurality of elongated drive electrodes arranged one next to another; and
   a plurality of elongated sensor electrodes arranged one next to another across the plurality of elongated drive electrodes, at least one of the plurality of elongated sensor electrodes or the plurality of elongated drive electrodes comprising a primary protrusion into a space between adjacent ones of the at least one of the plurality of elongated sensor electrodes or the plurality of elongated drive electrodes, a first plurality of secondary protrusions extending perpendicularly from the primary protrusion, and a second plurality of secondary protrusions extending perpendicularly from the primary protrusion opposite the first plurality of secondary protrusions so that the first plurality of secondary protrusions and the second plurality of secondary protrusions form a generally triangular area.

2. The mutual capacitance PCT panel as recited in claim 1, wherein the plurality of elongated sensor electrodes comprises a pitch of at least five millimeters (5 mm).

3. The mutual capacitance PCT panel as recited in claim 1, wherein the primary protrusion extends past a center line defined between adjacent ones of the at least one of the plurality of elongated sensor electrodes or the plurality of elongated drive electrodes.

4. The mutual capacitance PCT panel as recited in claim 1, wherein at least the other of the plurality of elongated sensor electrodes or the plurality of elongated drive electrodes comprises a second protrusion into a space between adjacent ones of the at least the other of the plurality of elongated sensor electrodes or the plurality of elongated drive electrodes.

5. The mutual capacitance PCT panel as recited in claim 4, wherein the second protrusion tapers away from the at least the other of the plurality of elongated sensor electrodes or the plurality of elongated drive electrodes.

6. The mutual capacitance PCT panel as recited in claim 4, wherein the second protrusion extends past a center line defined between adjacent ones of the at least the other of the plurality of elongated sensor electrodes or the plurality of elongated drive electrodes.

7. A method of forming a mutual capacitance Projected Capacitive Touch (PCT) panel comprising:
   forming a plurality of elongated drive electrodes arranged one next to another; and
   forming a plurality of elongated sensor electrodes arranged one next to another across the plurality of elongated drive electrodes, at least one of the plurality of elongated sensor electrodes or the plurality of elongated drive electrodes comprising a primary protrusion into a space between adjacent ones of the at least one of the plurality of elongated sensor electrodes or the plurality of elongated drive electrodes, a first plurality of secondary protrusions extending perpendicularly from the primary protrusion, and a second plurality of secondary protrusions extending perpendicularly from the primary protrusion opposite the first plurality of secondary protrusions so that the first plurality of secondary protrusions and the second plurality of secondary protrusions form a generally triangular area.

8. The method as recited in claim 7, wherein the plurality of elongated sensor electrodes comprises a pitch of at least five millimeters (5 mm).

9. The method as recited in claim 7, wherein the primary protrusion extends past a center line defined between adjacent ones of the at least one of the plurality of elongated sensor electrodes or the plurality of elongated drive electrodes.

10. The method as recited in claim 7, wherein at least the other of the plurality of elongated sensor electrodes or the plurality of elongated drive electrodes comprises a second protrusion into a space between adjacent ones of the at least the other of the plurality of elongated sensor electrodes or the plurality of elongated drive electrodes.

11. The method as recited in claim 10, wherein the second protrusion tapers away from the at least the other of the plurality of elongated sensor electrodes or the plurality of elongated drive electrodes.

12. The method as recited in claim 10, wherein the second protrusion extends past a center line defined between adjacent ones of the at least the other of the plurality of elongated sensor electrodes or the plurality of elongated drive electrodes.

13. A mutual capacitance Projected Capacitive Touch (PCT) panel comprising:

a plurality of elongated drive electrodes arranged one next to another and comprising a first protrusion into a space between adjacent ones of the plurality of elongated drive electrodes; and a plurality of elongated sensor electrodes arranged one next to another across the plurality of elongated drive electrodes and comprising a second protrusion into a space between adjacent ones of the plurality of elongated sensor electrodes, at least one of the first protrusion or the second protrusion comprising a first plurality of secondary protrusions extending perpendicularly from the at least one of the first protrusion or the second protrusion and a second plurality of secondary protrusions extending perpendicularly from the at least one of the first protrusion or the second protrusion opposite the first plurality of secondary protrusions so that the first plurality of secondary protrusions and the second plurality of secondary protrusions form a generally triangular area.

14. The mutual capacitance PCT panel as recited in claim 13, wherein the pitch of the plurality of elongated sensor electrodes comprises at least five millimeters (5 mm).

15. The mutual capacitance PCT panel as recited in claim 13, wherein at least one of the first protrusion or the second protrusion extends past a center line defined between adjacent ones of at least one of the plurality of elongated sensor electrodes or the plurality of elongated drive electrodes.

16. The mutual capacitance PCT panel as recited in claim 15, wherein at least the other of the first protrusion or the second protrusion extends past a center line defined between adjacent ones of at least the other of the plurality of elongated sensor electrodes or the plurality of elongated drive electrodes.

17. The mutual capacitance PCT panel as recited in claim 13, wherein at least the other of the of the first protrusion or the second protrusion comprises a third plurality of secondary protrusions extending perpendicularly from the at least the other of the first protrusion or the second protrusion and a fourth plurality of secondary protrusions extending perpendicularly from the at least the other of the first protrusion or the second protrusion opposite the third plurality of secondary protrusions so that the third plurality of secondary protrusions and the fourth plurality of secondary protrusions form a generally triangular area.

\* \* \* \* \*